US012680903B2

(12) United States Patent
Kim et al.

(10) Patent No.: US 12,680,903 B2
(45) Date of Patent: Jul. 14, 2026

(54) MANIFOLD

(71) Applicants:Hyundai Motor Company, Seoul (KR); Kia Corporation, Seoul (KR); TAEKWANGFUJIKIN CO., LTD, Busan (KR)

(72) Inventors: Jong Cheon Kim, Hwaseong-si (KR); Jae Jun Lee, Hwaseong-si (KR); Gu Ho Kim, Busan (KR); Yong Ki Kim, Busan (KR); Yong Seob Sin, Busan (KR)

(73) Assignees: Hyundai Motor Company, Seoul (KR); Kia Corporation, Seoul (KR); TAEKWANGFUJIKIN CO., LTD, Busan (KR)

( * ) Notice: Subject to any disclaimer, the term of this patent is extended or adjusted under 35 U.S.C. 154(b) by 42 days.

(21) Appl. No.: 18/907,889

(22) Filed: Oct. 7, 2024

(65) Prior Publication Data

US 2025/0130132 A1     Apr. 24, 2025

(30) Foreign Application Priority Data

Oct. 23, 2023     (KR) ......................... 10-2023-0142288

(51) Int. Cl.
*G01M 3/22*          (2006.01)
*F16L 41/03*         (2006.01)
(52) U.S. Cl.
CPC ............. *G01M 3/223* (2013.01); *F16L 41/03* (2013.01); *F16L 2201/30* (2013.01)

(58) Field of Classification Search
CPC ..... G01M 3/223; F16L 41/03; F16L 19/0212; F16L 19/025; F16L 15/008; F16L 19/07; H01M 8/2484
See application file for complete search history.

(56) References Cited

U.S. PATENT DOCUMENTS

| | | | |
|---|---|---|---|
| 135,052 A | 1/1873 | Wetmore | |
| 2,271,732 A | 2/1942 | Chappuis | |
| 3,124,370 A | 3/1964 | Traugott | |
| 4,993,722 A * | 2/1991 | Gundy | .................... F16J 15/46 277/606 |

(Continued)

FOREIGN PATENT DOCUMENTS

| | | | |
|---|---|---|---|
| DE | 688252 C | * | 2/1940 |
| DE | 713892 C | | 11/1941 |

(Continued)

OTHER PUBLICATIONS

JP-09014556-A, Jan. 17, 1997.*

*Primary Examiner* — Matthew Troutman
*Assistant Examiner* — James A Linford
(74) *Attorney, Agent, or Firm* — Slater Matsil, LLP

(57) ABSTRACT

A manifold can include a manifold body including a fluid passage allowing a fluid to flow and a port provided to discharge the fluid from the fluid passage, a pipe inserted into the port of the manifold body, and including a pipe fluid passage connected to the fluid passage when the pipe is inserted into the port, a nut member inserted into the port and coupled to the manifold body while supporting the pipe, and a sealing member provided to receive a sensing dye inside the sealing member and to discharge the sensing dye out of the port through the fluid flowing of the port from the fluid passage or the pipe fluid passage.

20 Claims, 12 Drawing Sheets

(56) References Cited

U.S. PATENT DOCUMENTS

| | | | | |
|---|---|---|---|---|
| 5,169,182 | A | * | 12/1992 | Hashimoto ............ B60K 15/01 |
| | | | | 285/353 |
| 5,188,398 | A | | 2/1993 | Parimore, Jr. et al. |
| 5,979,945 | A | | 11/1999 | Hitachi et al. |
| 7,246,601 | B2 | | 7/2007 | Yamamoto et al. |
| 7,547,049 | B2 | | 6/2009 | Gashgaee |
| 2004/0195837 | A1 | | 10/2004 | Kondo et al. |
| 2007/0126233 | A1 | | 6/2007 | Gashgaee |
| 2012/0256412 | A1 | | 10/2012 | Oh |
| 2013/0170922 | A1 | | 7/2013 | Persson |
| 2021/0131595 | A1 | | 5/2021 | Patch et al. |

FOREIGN PATENT DOCUMENTS

| | | | | | |
|---|---|---|---|---|---|
| DE | 1600474 | A1 | * | 2/1970 | |
| DE | 4032562 | A1 | * | 4/1992 | .......... B29C 48/834 |
| DE | 19501546 | A1 | | 7/1996 | |
| DE | 102008057381 | A1 | * | 7/2009 | .......... G01M 3/2223 |
| EP | 1045188 | A2 | * | 10/2000 | ............. F16L 41/14 |
| FR | 1086073 | A | * | 2/1955 | |
| FR | 1390727 | A | * | 2/1965 | ............ F02M 55/02 |
| FR | 2883623 | A1 | | 9/2006 | |
| JP | 2013130295 | A | | 7/2013 | |
| KR | 101962473 | B1 | | 3/2019 | |
| KR | 102280987 | B1 | | 7/2021 | |
| KR | 20220155821 | A | | 11/2022 | |
| WO | 9509317 | A1 | | 4/1995 | |

* cited by examiner

MANIFOLD

CROSS-REFERENCE TO RELATED APPLICATIONS

This application claims the benefit of priority to Korean Patent Application No. 10-2023-0142288, filed in the Korean Intellectual Property Office on Oct. 23, 2023, the entire contents of which are incorporated herein by reference.

TECHNICAL FIELD

The present disclosure relates to a manifold.

BACKGROUND

Recently, crisis awareness of environmental and oil resource depletion has increased, research and development on an electric vehicle, which is an eco-friendly vehicle, has been spotlighted. The electric vehicle includes a plug-in Hybrid Electric Vehicle (PHEV), a Battery Electric Vehicle (BEV), or a Fuel Cell Electric Vehicle (FCEV).

The FCEV may include a fuel cell stack to generate electricity using hydrogen and a hydrogen storage tank to store hydrogen.

The FCEV essentially requires a large-capacity hydrogen storage tank to increase range. The hydrogen storage tank has the shape of a cylinder extending in a width direction of the vehicle, to ensure longer range of the hydrogen storage tank.

Hydrogen transmitted from the hydrogen storage tank to a fuel cell stack has generally higher pressure, so the FCEV includes a manifold for distributing high-pressure hydrogen inside. The manifold may include a manifold body including a flow passage and a port to distribute a fluid inside and a pipe connected to the manifold body.

An outflow of high-pressure hydrogen gas flowing through the manifold may cause safety accidents. Accordingly, to prevent the safety accident, the need for a manifold having a more stable structure to sense the leakage of hydrogen gas has come up.

SUMMARY

The present disclosure relates to a manifold. Some embodiments of the present disclosure can solve the above-mentioned problems occurring in the prior art while advantages achieved by the prior art are maintained intact.

An embodiment of the present disclosure can provide a manifold in which a higher-pressure fluid is distributed and a pipe is inserted into a manifold body through a more stable structure.

An embodiment of the present disclosure can provide a manifold capable of sensing a fluid flowing out of a port.

Technical problems to be solved by some embodiment of the present disclosure are not limited to the aforementioned problems, and solutions using embodiments for other technical problems not mentioned herein can be clearly understood from the following description by those skilled in the art to which the present disclosure pertains.

According to an embodiment of the present disclosure, a manifold may include a manifold body including a manifold fluid passage and a port configured to discharge a fluid from the manifold fluid passage, a pipe inserted into the port of the manifold body and including a pipe fluid passage fluidly connected to the manifold fluid passage via the port, nut member inserted into the port and coupled to the manifold body while supporting the pipe, and a sealing member interposed between the nut member and the manifold body outside of the pipe, wherein the sealing member includes a sensing dye therein, and wherein the sealing member is configured to discharge the sensing dye out of the port along with the fluid flowing out of the port from the manifold fluid passage or the pipe fluid passage.

The sealing member may include a sealing member body being outside of the pipe, and a receiving part inside the sealing member body configured to receive the sensing dye therein.

The sealing member may further include an orifice formed in the sealing member body and configured to fluidly communicate the receiving part to the port.

The orifice may be on an outer circumferential surface of the sealing member body.

A cross-sectional area of the orifice may be increased radially outward.

The sealing member may further include an outflowing surface extending to be inclined in a direction perpendicular to a radial outer direction of the sealing member body.

The sealing member may further include a top surface making contact with the nut member, and a chamfer surface recessed radially outward of the sealing member body from the top surface.

The sealing member may include rubber.

The nut member may include a fixing surface inserted into the port such that the pipe is fixed to the port and extending in a circumferential direction such that the fixing surface is coupled to an inner circumferential surface of the port, and a guide slot in the fixing surface.

The guide slot may extend in a direction in which the nut member is inserted into the port.

The nut member may include a pressing surface making contact with the sealing member, and a nut-inclined surface that is inclined in a direction away from the sealing member with respect to an outside of the pressing surface.

The nut member may include an inserting surface facing the sealing member, and a pressing protrusion protruding from the inserting surface toward the sealing member and making contact with the sealing member such that the inserting surface is spaced apart from the sealing member.

The sensing dye may include a fluorescent dye configured to be visible using ultraviolet light.

According to an embodiment of the present disclosure, a manifold system may include a manifold body having a first outer surface, a port extending into the manifold body from the first outer surface, the port having a female-threaded portion with a port diameter, and a manifold fluid passage extending from a bottom surface of the port into the manifold body, a pipe having a pipe fluid passage configured to be fluidly coupled to the manifold fluid passage via the port, a nut member having an inner circumferential surface configured to receive and support an outer circumferential surface of the pipe therein, the nut member having a male-threaded portion on a nut fixing part, the male-threaded portion being configured to threadedly engage with the female-threaded portion of the port, the nut member having a pressing surface configured to face the bottom surface of the port when the nut member is threadedly engaged with the port and a sealing member configured to be outside of the pipe and interposed between the pressing surface of the nut member and the bottom surface of the port when the nut member is threadedly engaged with the port, wherein the sealing member includes a sensing dye therein.

The sealing member may include a receiving part therein containing the sensing dye, wherein the sealing member includes an orifice extending from the receiving part to a radially outer surface of the sealing member, and wherein the sealing member is configured such that the receiving part is fluidly coupled to the port via the orifice when the nut member is threadedly engaged with the port and when the sealing member is interposed between the pressing surface of the nut member and the bottom surface of the port.

The radially outer surface of the sealing member may have a generally v-shaped sectional shape.

According to an embodiment of the present disclosure, a manifold system may include a manifold body having a first outer surface, a port extending into the manifold body from the first outer surface, the port having a female-threaded portion with a port diameter, and a manifold fluid passage extending from a bottom surface of the port into the manifold body, a pipe having a pipe fluid passage configured to be fluidly coupled to the manifold fluid passage via the port, a nut member having an inner circumferential surface configured to receive and support an outer circumferential surface of the pipe therein, the nut member having a male-threaded portion on a nut fixing part, the male-threaded portion being configured to threadedly engage with the female-threaded portion of the port, the nut member having a pressing surface configured to face the bottom surface of the port when the nut member is threadedly engaged with the port, wherein the nut fixing part includes a guide slot therein, the guide slot extending along the nut fixing part to intersect the male-threaded portion, such that the guide slot is configured to provide fluid communication between a bottom space of the port adjacent to the bottom surface and the first outer surface of the manifold body when the nut member is threadedly engaged with the port and a sealing member configured to be outside of the pipe and interposed between the pressing surface of the nut member and the bottom surface of the port when the nut member is threadedly engaged with the port, wherein the sealing member includes a sensing dye therein.

The sealing member may include a receiving part therein containing the sensing dye, wherein the sealing member includes an orifice extending from the receiving part to a radially outer surface of the sealing member, and wherein the sealing member is configured such that the receiving part is fluidly coupled to the bottom space of the port via the orifice when the nut member is threadedly engaged with the port and when the sealing member is interposed between the pressing surface of the nut member and the bottom surface of the port.

The radially outer surface of the sealing member may have a generally v-shaped sectional shape.

The guide slot may extend in a direction in which the nut member is inserted into the port, wherein a cross-sectional area of the orifice is increased radially outward, wherein the sealing member includes rubber, and wherein the sensing dye includes a fluorescent dye configured to be visible using ultraviolet light.

BRIEF DESCRIPTION OF THE DRAWINGS

The above and other features and advantages of the present disclosure can be more apparent from the following detailed description taken in conjunction with the accompanying drawings, in which.

DETAILED DESCRIPTION OF ILLUSTRATIVE EMBODIMENTS

Figure 1:
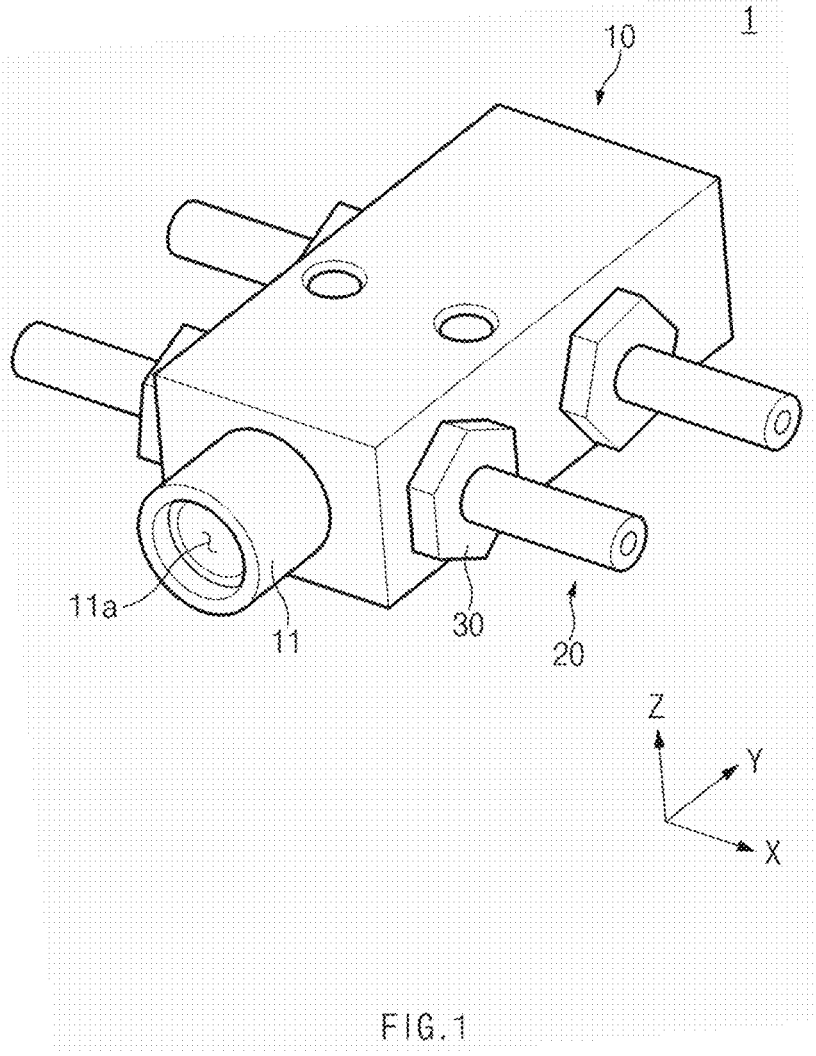
FIG. 1 is a perspective view of a manifold, according to an embodiment of the present disclosure.

Hereinafter, some example embodiments of the present disclosure will be described in detail with reference to accompanying drawings. In adding the reference numerals to the components of each drawing, it can be noted that the identical or equivalent component can be designated by the identical numeral even when they are displayed on other drawings. In the present disclosure, a detailed description of well-known features or functions can be omitted to not unnecessarily obscure the gist of the present disclosure.

In describing the components of the example embodiments of the present disclosure, terms such as "first", "second", "A", "B", "(a)", "(b)", and the like, may be used. Such terms can be merely intended to distinguish one component from another component, and such terms do not necessarily limit the nature, sequence, or order of the constituent components. Unless otherwise defined, terms used herein, including technical or scientific terms, can have a same meaning as those generally understood by those skilled in the art to which the present disclosure pertains. Such terms as those defined in a generally used dictionary can be interpreted as having meanings equal to contextual meanings in the relevant field of art.

Hereinafter, example embodiments of the present disclosure will be described in detail with reference to FIGS. 1 to 12.

Figure 2:
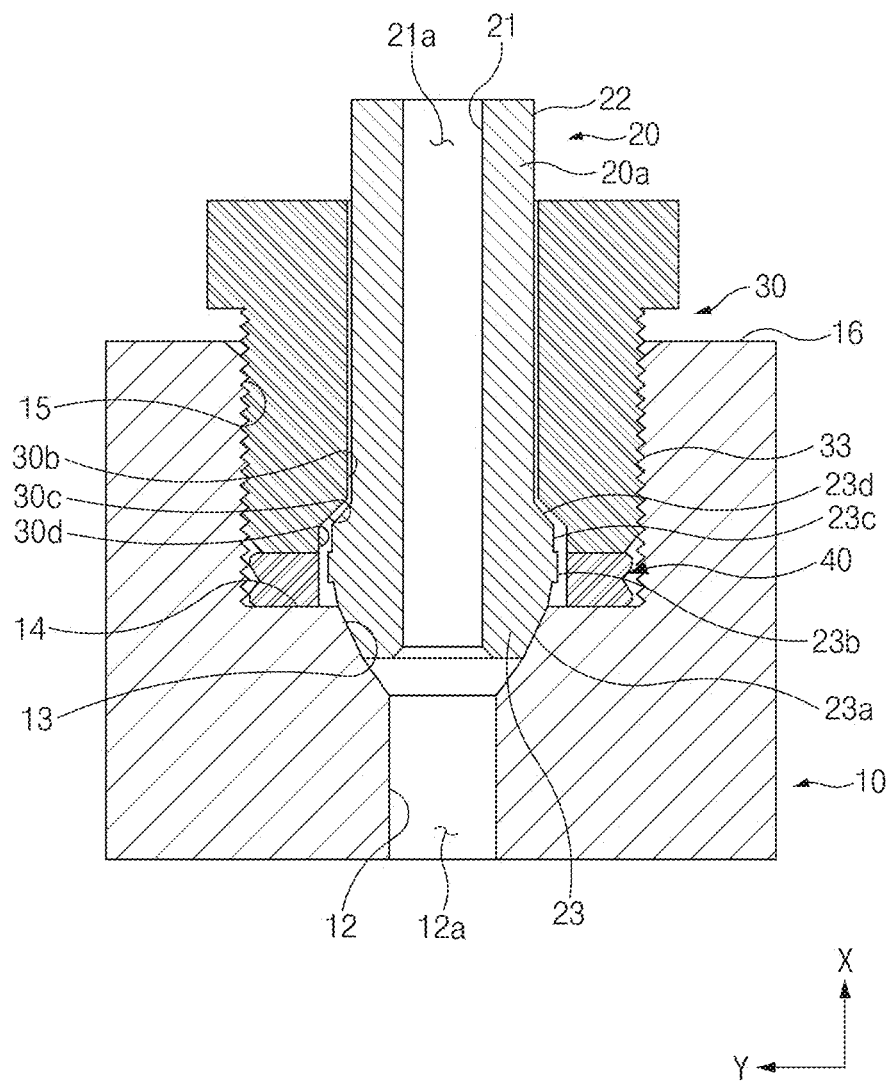
FIG. 2 is a side sectional view of a pipe inserted into a manifold body, according to an embodiment of the present disclosure.
Figure 3:
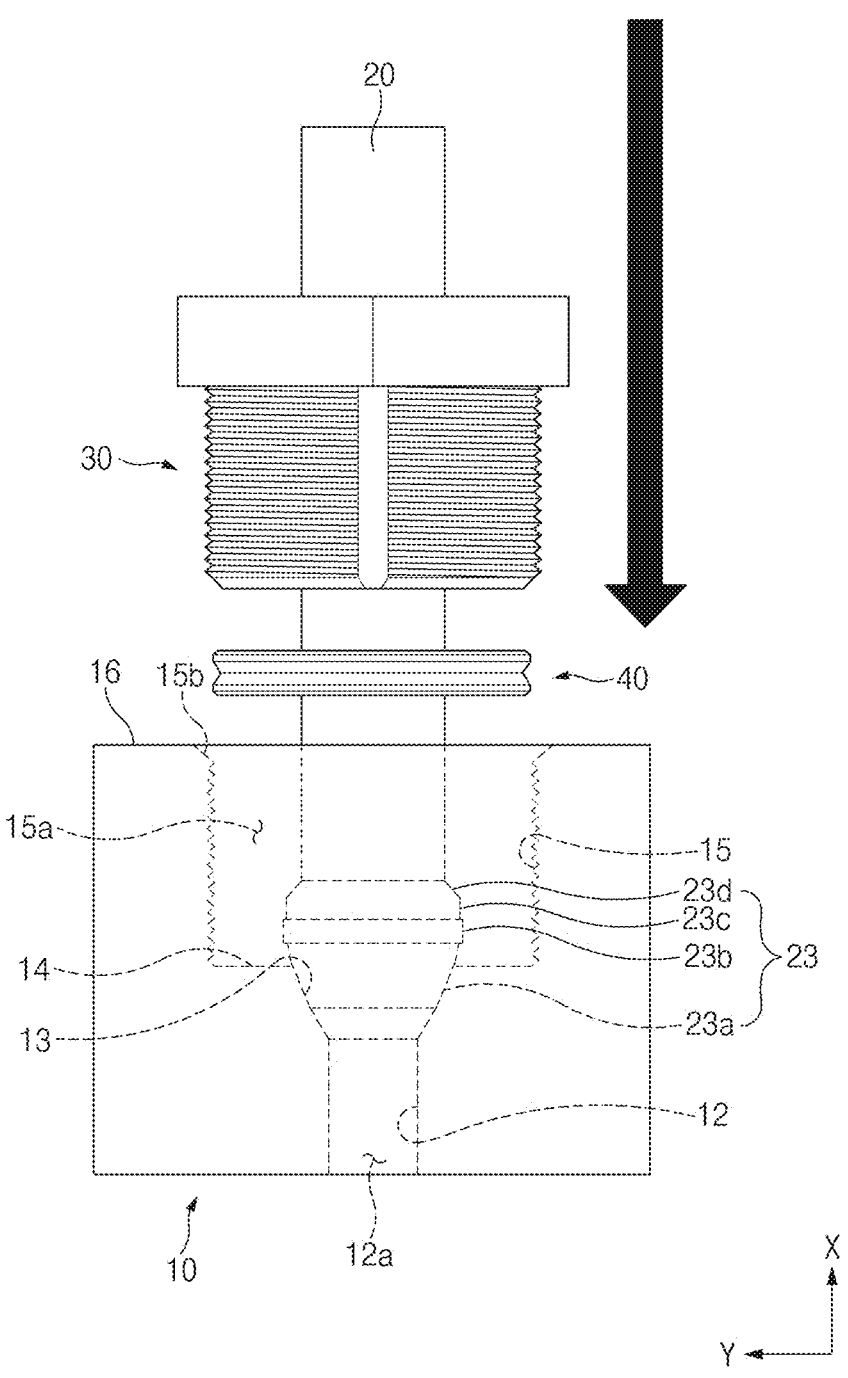
FIG. 3 is a side view illustrating a nut member and a sealing member separated from a manifold body, according to an embodiment of the present disclosure.

FIG. 1 is a side view of a manifold, according to an embodiment of the present disclosure. FIG. 2 is a side sectional view of a pipe inserted into a manifold body, according to an embodiment of the present disclosure. FIG. 3 is a side view illustrating a nut member and a sealing member separated from a manifold body, according to an embodiment of the present disclosure.

Referring to FIGS. 1 to 3, a manifold 1 may include a manifold body 10 including an inflow communicating part 11 having an inflow hole 11a for inflowing of a fluid. Hereinafter, the fluid may be hydrogen gas, but the present disclosure is not limited thereto.

The manifold body 10 may include a fluid passage 12a communicating with an inflow hole 11a to discharge a fluid flowing through the inflow hole 11a, and a port 15a formed to be concave from the outer surface 16 to discharge the fluid from the fluid passage 12a.

The manifold 1 may include a pipe 20 inserted into each of a plurality of ports 15a to form a pipe fluid passage 21a connected to the fluid passage 12a. The fluid, which can flow through fluid passages 12a provided inside the manifold body 10, as the plurality of pipes 20 can be inserted into the manifold body 10, may be discharged through the pipes 20 or introduced through the pipes 20.

The manifold 1 may include a nut member 30, which can serve as a component to support an outer circumferential surface 22 of each pipe 20, inserted into the port 15a and coupled to the manifold body 10 while supporting the pipe 20.

The manifold body 10 may be screwed with a fixing surface 33, which can be an outer circumferential surface of the nut member 30, through an inner circumferential surface 15 defining the port 15a. The nut member 30 may be inserted into the port 15a while supporting the pipe 20, and coupled to the manifold body 10. Accordingly, the nut member 30 may fix the pipe 20 to the port 15a.

The manifold 1 may be a component mounted inside a vehicle to distribute hydrogen gas from a hydrogen storage tank (not illustrated) or to supply hydrogen gas to the hydrogen storage tank, for example.

For manifold 1 to distribute a higher-pressure fluid, such as hydrogen gas, the gas sealing performance of the manifold body 10 and the pipe 20 is required. Due to the environment in which the manifold 1 is mounted inside the vehicle, the manifold 1 can have a supporting structure under higher fastening torque.

When the port 15a of the manifold body 10 neither protrudes from the outer surface 16 nor the nut member 30 is inserted into the port 15a, the outer diameter of the port 15a may be changed due to the repeated coupling between the pipe 20 and the nut member 30, and the manifold body 10, which may cause relatively difficulties in assembling the manifold body 10, the pipe 20, and the nut member 30, thereby weakening durability and usability.

To solve such a problem, according to an embodiment of the present disclosure, the structure may be provided in which the port 15a formed in a concave shape from the outer surface 16 of the manifold body 10 may be provided, and the position of the pipe 20 can be fixed through the nut member 30 as the pipe 20 is inserted toward the port 15a.

In such a structure, the nut member 30 and the pipe 20 can be inserted into the port 15a. Accordingly, when compared to the structure in which the pipe 20 is coupled at outside of the port 15a, the productivity of the manifold 1 may be improved, because the insertion position of the pipe 20 and the nut member 30 into the port 15a may be guided.

In more detail, the manifold body 10 may include a discharge surface 12 extending in a first direction (X direction) toward the port 15a while defining a fluid passage 12a, and a guide surface 13 having a sectional area widened toward the port 15a from one end portion, which is adjacent to the port 15a, of the discharge surface 12.

The manifold body 10 may include a port surface 14, which extends from the guide surface 13 and radially outward from the virtual central line passing through the center of the fluid passage 12a in the first direction (X direction), the inner circumferential surface 15 extending in the first direction (X direction) from the port surface 14 to surround the port 15a, and an outer surface 16 connected to the inner circumferential surface 15.

The inner circumferential surface 15 may be formed to have a thread and correspond to the fixing surface 33 of the nut member 30. An inner circumferential guide surface 15b may be provided at a part, which is adjacent to the outer surface 16, of the inner circumferential surface 15. The inner circumferential guide surface 15b may be a surface to guide that the nut member 30 is introduced into the port 15a while being aligned.

The pipe 20 may be inserted into the port 15a in a direction (−X direction) opposite to the first direction. The pipe 20 may include a pipe body 20a extending in a first direction (X direction) and an inflowing part 23 provided at an end portion of the pipe body 20a in the direction in which the pipe body 20a is inserted.

The outer circumferential surface 22 of the pipe 20 may be an outer circumferential surface of the pipe body 20a, and the inner surface 21 of the pipe 20 may be an inner surface of the pipe body 20a and the inflowing part 23. The outer circumferential surface 22 of the pipe body 20a and the inner surface 21 of the pipe 20 may have a circular sectional surface, when viewed in the direction in which the pipe 20 is inserted into the port 15a. However, the present disclosure is not limited thereto. For example, the outer circumferential surface 22 of the pipe body 20a and the inner surface 21 of the pipe 20 may have a rectangular sectional surface, when viewed in the direction in which the pipe 20 is inserted into the port 15a.

The inflowing part 23 of the pipe 20 may protrude radially outward of the pipe body 20a from a circumferential surface of the pipe body 20a and may be inserted into the port 15a toward the guide surface 13.

The inflowing part 23 of the pipe 20 may include an inflowing surface 23a corresponding to the guide surface 13 to make contact with the guide surface 13 and a circumferential rib 23b protruding radially outward of the pipe body 20a while extending from the inflowing surface 23a. The inflowing surface 23a and the circumferential rib 23b may extend in the circumferential direction of the pipe body 20a.

In this example, the pipe 20 and the manifold body 10 can be formed of metal to have a structure of sealing between the inflowing part 23 of the pipe 20 and the guide surface 13, as metal contacts with metal between the inflowing part 23 of the pipe 20 and the guide surface 13. In other words, the inflowing surface 23a of the pipe 20 and the guide surface 13 of the manifold body 10 can make contact with each other to cause plastic deformation and to endure the fastening torque having stronger strength. Accordingly, the gas sealing may be improved between the pipe 20 and the manifold body 10.

The inflowing part 23 of the pipe 20 may include a support surface 23d having a sectional area increased in the opposite direction (−X direction) to the first direction (X direction) from the outer circumferential surface 22 of the pipe body 20a and a circumferential surface 23c that extends in the opposite direction (−X direction) to the first direction and is recessed inward and formed in a radial direction of the pipe body 20a from the circumferential rib 23b. In other words, the circumferential surface 23c may be recessed radially inward from the circumferential rib 23b to extend toward the support surface 23d in the first direction (X direction).

The support surface 23d and the circumferential surface 23c may protrude radially outward of the pipe body 20a the outer circumferential surface 22 of the pipe body 20a to support the circumferential rib 23b.

The inflowing part 23 of the pipe 20 may be formed to be caught by the nut member 30 while the nut member 30 is fixed to the manifold body 10 to prevent the pipe 20 from being withdrawn from the port 15a in the first direction (X direction).

The nut member 30 may include an inner circumferential surface 30b which can support the outer circumferential surface 22 of the pipe body 20a, a locking surface 30c extending to have a cross-sectional area increased from the inner circumferential surface 30b in the direction in which the nut member 30 is inserted into the port 15a, such that the support surface 23d of the pipe 20 is locked to the locking surface 30c, and a through surface 30d extending from the locking surface 30c in the opposite direction (–X direction) to the first direction (X direction) such that the inflowing part 23 passes through the through surface 30d.

The manifold 1 may include a sealing member 40 interposed between the nut member 30 and the manifold body 10 and configured to seal between the pipe 20 and the manifold body 10. The sealing member 40 may be interposed between the nut member 30 and a port surface 14 and being outside the pipe 20 (e.g., concentrically).

The sealing member 40 may be provided to receive a sensing dye 50 (see FIG. 8) inside the sealing member 40, and configured to discharge the sensing dye 50 to the outside of the port 15a through the fluid flowing from the fluid passage 12a or the pipe fluid passage 21a to the port 15a.

According to an embodiment of the present disclosure, after the pipe 20 is inserted into the port 15a, the sealing member 40 and the nut member 30 may be inserted into the port 15a along the pipe 20. Alternatively, in the state that the pipe 20 can be supported by the nut member 30, the pipe 20 may be inserted into the port 15a together with the sealing member 40. Alternatively, the sealing member 40 may be inserted first before the pipe 20 and the nut member 30.

Figure 4:
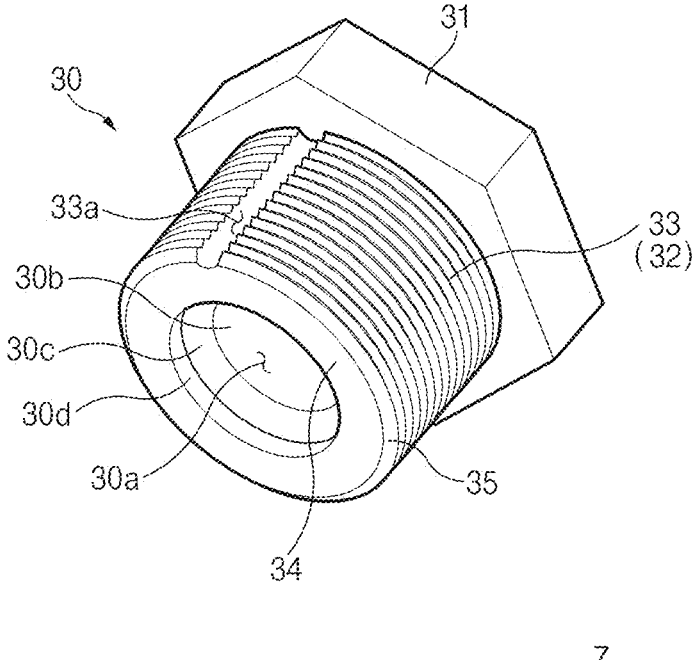
FIG. 4 is a bottom perspective view of a nut member, according to an embodiment of the present disclosure.
Figure 5:
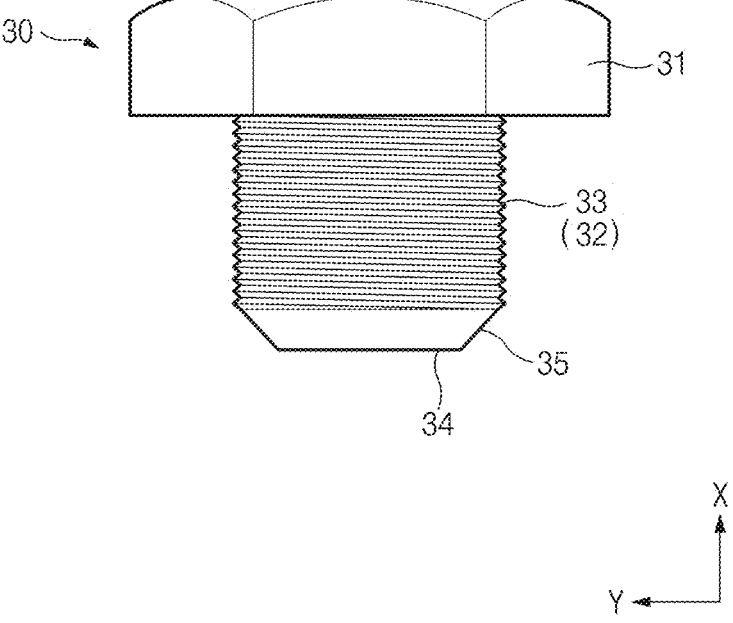
FIG. 5 is a side view of a nut member, according to an embodiment of the present disclosure.

FIG. 4 is a bottom perspective view of a nut member, according to an embodiment of the present disclosure. FIG. 5 is a side view of a nut member, according to an embodiment of the present disclosure.

Referring to FIGS. 4 and 5, the nut member 30 may include a nut head part 31 being outside the port 15a (see FIG. 1), and a nut fixing part 32 configured to couple with an inner circumferential surface 15 of the port 15a, as the nut member 30 is inserted into the port 15a.

The nut member 30 may include a nut hole 30a provided inside the nut head part 31 and the nut fixing part 32 such that the pipe body 20a (see FIG. 2) can be inserted into the nut hole 30a.

The nut fixing part 32 may include a fixing surface 33 extending in the circumferential direction with a thread corresponding to the inner circumferential surface 15 of the port 15a, and a guide slot 33a formed in the fixing surface 33 and extending in the direction in which the nut member 30 is inserted into the port 15a. However, the extending direction of the guide slot 33a is not limited to the first direction (X direction), and may extend in a spiral shape or other shape along the circumference of the fixing surface 33.

The nut fixing part 32 may include a pressing surface 34 configured to be inserted into the port 15a to face the port surface 14 and a nut-inclined surface 35 inclined or beveled radially outward of the nut fixing part 32 from the pressing surface 34.

To be described below, the pressing surface 34 of the nut fixing part 32 may be a surface making contact with the sealing member 40 to press the sealing member 40, and the nut-inclined surface 35 may be a surface inclined or beveled in the first direction (X direction) from the pressing surface 34 such that the nut-inclined surface 35 is spaced apart from the sealing member 40. In other words, the nut-inclined surface 35 may be inclined in a direction away from the sealing member with respect to an outside of the pressing surface 34.

Figure 6:
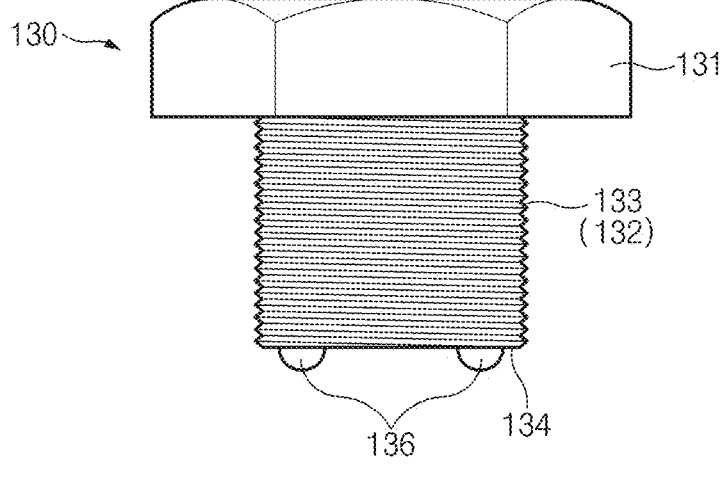
FIG. 6 is a side view of a nut member, according to another embodiment of the present disclosure.

FIG. 6 is a side view of a nut member, according to an embodiment of the present disclosure.

Referring to FIG. 6, the nut member 130 may include an inserting surface 134 configured to face the sealing member 40 toward the port surface 14 (see FIG. 2) and pressing protrusions 136 protruding toward the sealing member 40 from the inserting surface 134 to space the inserting surface 134 apart from the sealing member 40 while pressing the sealing member 40, instead of the structure the pressing surface 34 (see FIG. 5) and the nut-inclined surface 35.

Through the above structure, the nut member 130 may press the sealing member 40 through the pressing protrusion 136, instead of the inserting surface 134.

Figure 7:
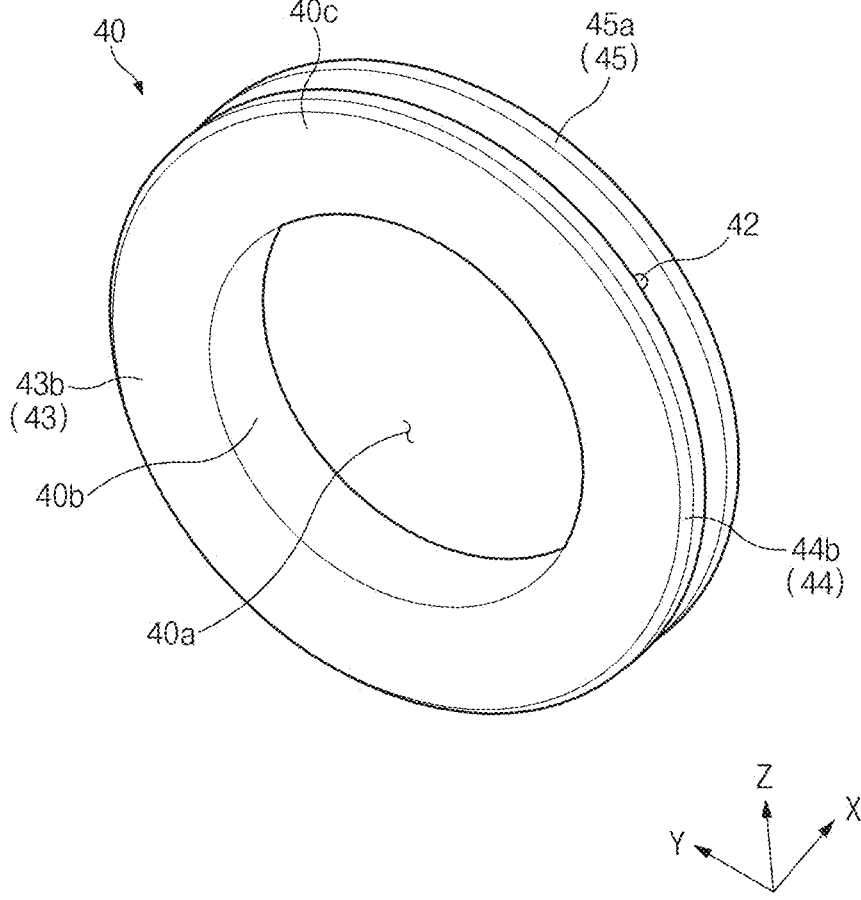
FIG. 7 is a bottom perspective view of a sealing member, according to an embodiment of the present disclosure.
Figure 8:
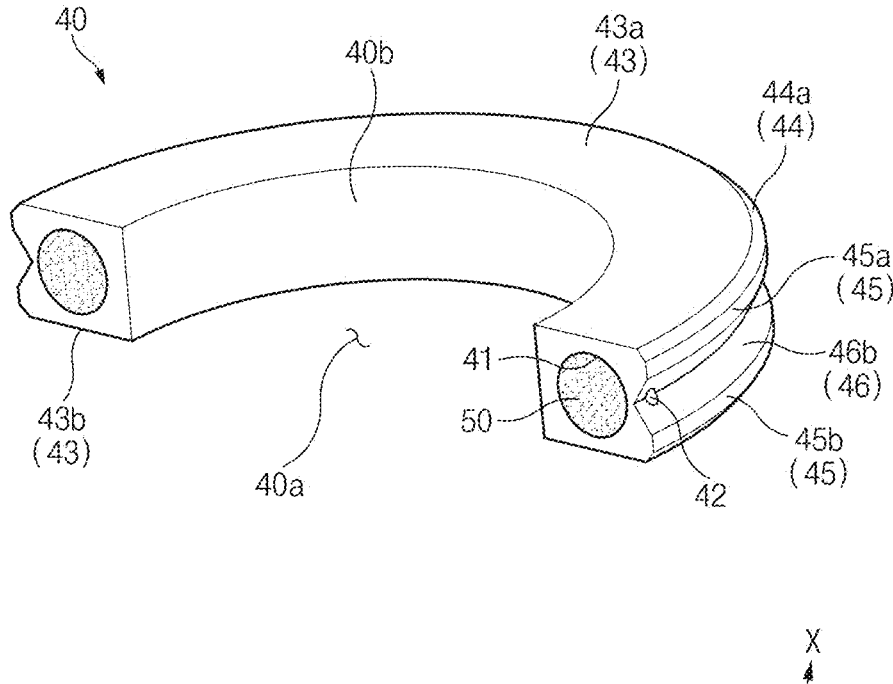
FIG. 8 is a sectional perspective view of a sealing member, according to an embodiment of the present disclosure.
Figure 9:
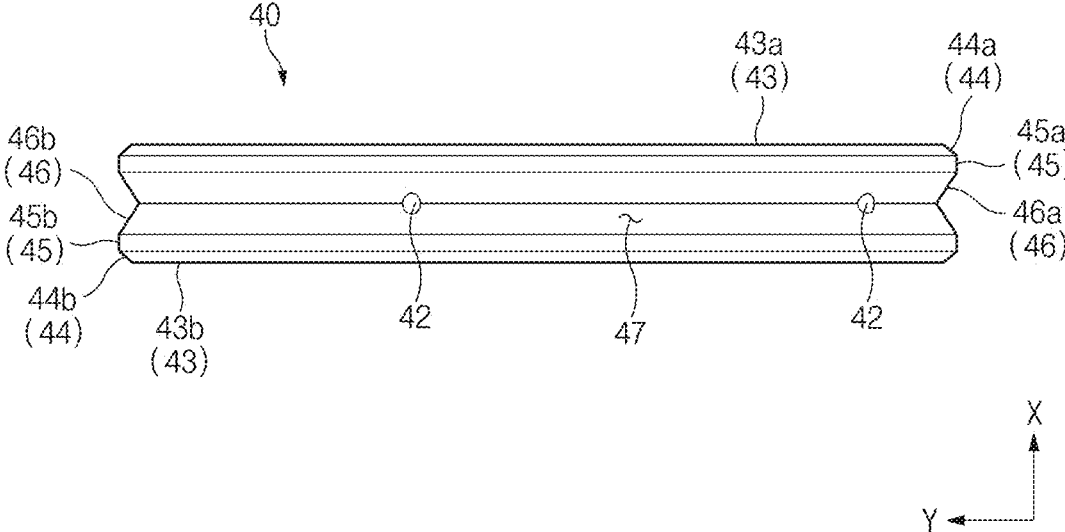
FIG. 9 is a side view of a sealing member, according to an embodiment of the present disclosure.
Figure 10:
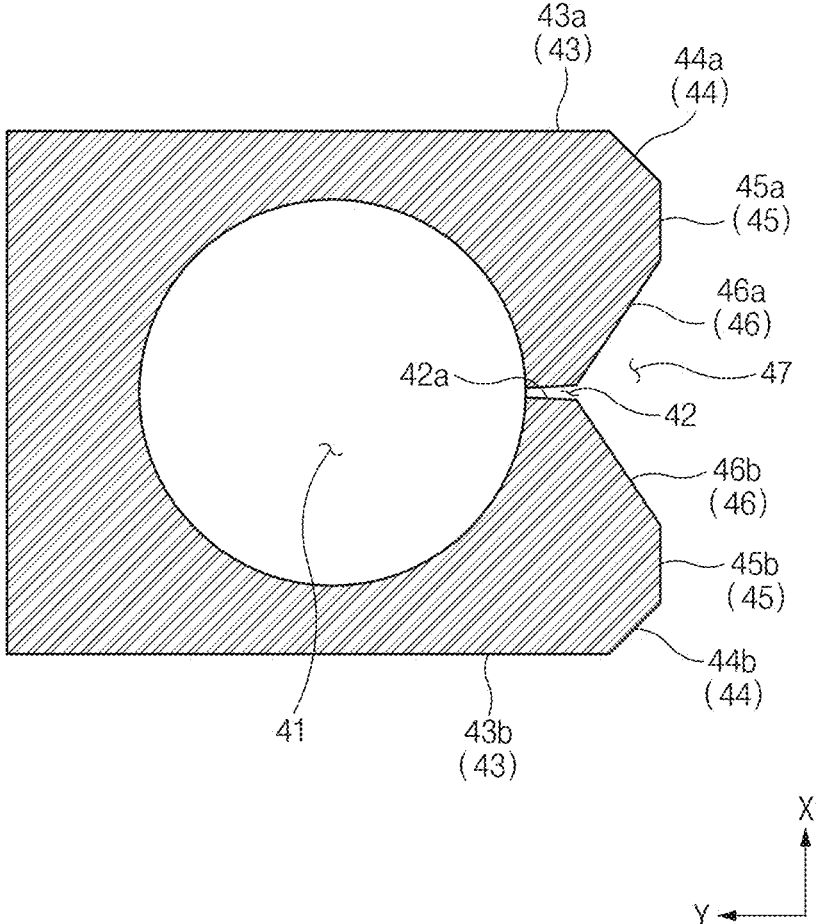
FIG. 10 is a side sectional view of a receiving part of a sealing member, according to an embodiment of the present disclosure.

FIG. 7 is a bottom perspective view of a sealing member 40, according to an embodiment of the present disclosure. FIG. 8 is a sectional perspective view of a sealing member 40, according to an embodiment of the present disclosure. FIG. 9 is a side view of a sealing member 40, according to an embodiment of the present disclosure. FIG. 10 is a side sectional view of a receiving part of a sealing member 40, according to an embodiment of the present disclosure.

Referring to FIGS. 7 to 10, the sealing member 40 may include a sealing member body 40c having a sealing hole 40a formed and configured to insert the pipe 20 (see FIG. 2) and to be outside the pipe 20, and a receiving part 41 formed inside the sealing member body 40c and configured to receive the sensing dye 50 therein.

The sensing dye 50 may include a fluorescent dye, and may be detected by a user using ultraviolet (UV) lighting.

The sealing member body 40c may extend in the circumferential direction and configured to be along the outer side of the pipe 20, and may include an inner circumferential surface 40b defining the sealing hole 40a.

The sealing member 40 may include an orifice 42 formed in the sealing member body 40c configured to communicate the receiving part 41 with the port 15a such that the sensing dye 50 can flow out to the port 15a. A plurality of orifices 42 may be provided along outer circumferential surfaces 45 and 46 of the sealing member 40.

In the sealing member 40, the sensing dye 50 may be provided and received into the receiving part 41 through the orifice 42, and the sensing dye 50 may flow out of the receiving part 41 to the port 15a through the orifice 42 by a higher-pressure fluid flowing out of the port 15a.

The sealing member body 40c may include a base surface 43 and a chamfer surface 44 recessed from the base surface 43 toward an outside of the sealing member 40.

The base surface 43 may include a top surface 43a configured to be facing the nut member 30 and to make contact with the nut member 30, and a bottom surface 43b configured to be facing the port surface 14 and to make contact with the port surface 14.

The chamfer surface 44 may include a first chamfer surface 44a recessed radially outward of the sealing member body 40c from the top surface 43a and a second chamfer surface 44b recessed radially outward of the sealing member body 40c from the bottom surface 43b.

The outer circumferential surfaces 45 and 46 of the sealing member body 40c may include connection surfaces 45 including a first connection surface 45a extending from the first chamfer surface 44*a* in the opposite direction (−X direction) to the first direction and a second connection surface 45*b* extending from the second chamfer surface 44*b* in the first direction (X direction).

The outer circumferential surfaces 45 and 46 of the sealing member body 40*c* may include outflowing surfaces 46 extending radially inward of the sealing member body 40*c* from the first connection surface 45*a* and the second connection surface 45*b* toward each other.

The outflowing surfaces 46 may include a first outflowing surface 46*a* extending radially inward of the sealing member body 40*c* in the opposite direction (−X direction) to the first direction from the first connection surface 45*a* and a second outflowing surface 46*b* extending radially inward of the sealing member body 40*c* in the first direction (X direction) from the second connection surface 45*b*.

The first outflowing surface 46*a* and the second outflowing surface 46*b* can extend in the circumferential direction of the sealing member body 40*c* to form an outflowing part 47 connected to the receiving part 41, together with the inner circumferential surface 15 of the port 15*a*.

A plurality of orifices 42 may be provided in the circumferential direction of the sealing member body 40*c* between the first outflowing surface 46*a* and the second outflowing surface 46*b*. More specifically, five orifices 42 may be provided at equal intervals in the circumferential direction of the sealing member body 40*c*.

The sealing member 40 may further include an orifice surface 42*a* surrounding the orifice 42 such that a cross-sectional area of the orifice 42 is increased radially outward of the sealing member body 40*c* from the receiving part 41.

The orifice 42 has the shape of the orifice surface 42*a* having a diameter increased radially outward of the sealing member body 40*c* to guide the sensing dye 50 such that the sensing dye 50 can receive pressure to flow out through the orifice 42

According to such a structure, the sensing dye 50 received in the receiving part 41 may flow out through the orifice surface 42*a*. Then, the sensing dye 50 may flow out to the outflowing part 47 along the outflowing surface 46, which extends to be inclined in a direction perpendicular to a radial outward direction of the sealing member body 40*c* with respect to the radial outward direction of the sealing member body 40*c*, from the orifice surface 42*a*.

The sealing member 40 may be formed of rubber, but the present disclosure is not limited thereto. For example, any object having elasticity may be sufficient to serve as the sealing member 40.

Hereinafter, the principle that the sensing dye 50 in the sealing member 40 flows out of the port 15*a* will be described in detail with reference to FIGS. 11 and 12.

Figure 11:
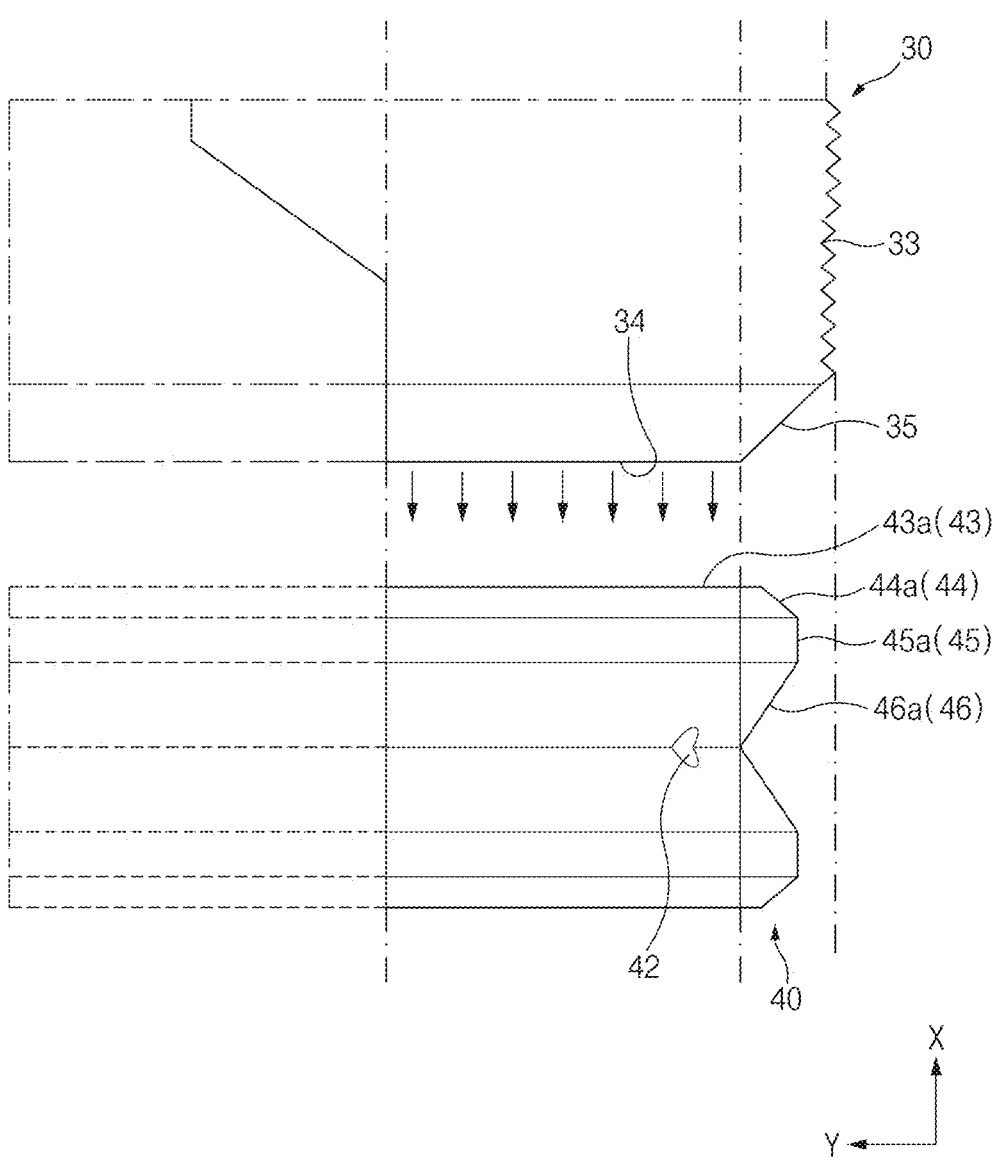
FIG. 11 is a schematic view illustrating a state in which a nut member presses a sealing member, according to an embodiment of the present disclosure.

FIG. 11 is a schematic view illustrating a state in which a nut member presses a sealing member, according to an embodiment of the present disclosure. FIG. 12 is a schematic view illustrating a sensing dye outflowing together with hydrogen gas flowing out of a manifold body to the outside of a port, according to an embodiment of the present disclosure.

Figure 12:
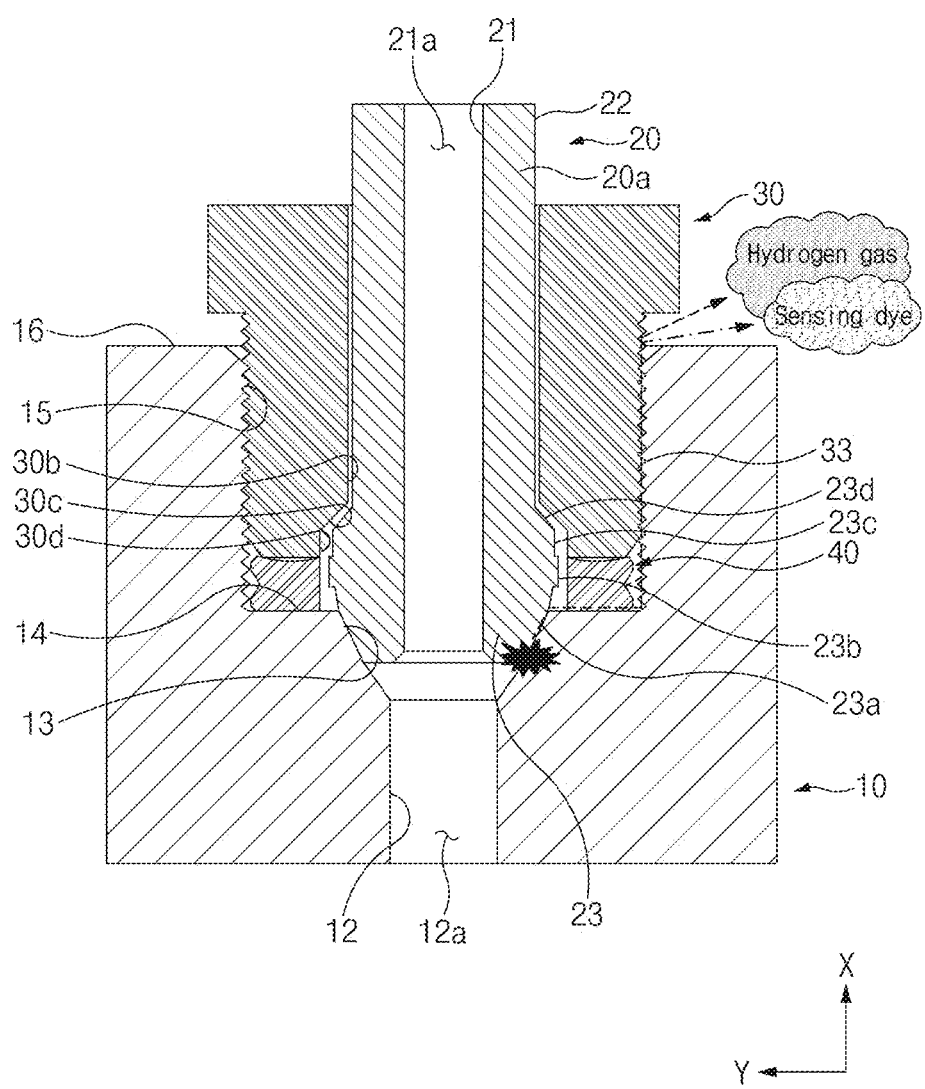
FIG. 12 is a schematic view illustrating a sensing dye outflowing together with hydrogen gas flowing out of a manifold body to the outside of a port, according to an embodiment of the present disclosure.

Referring to FIGS. 11 and 12, the sealing member 40 and the nut member 30 may be inserted into the port 15*a* in the state that the pipe 20 is inserted into the port 15*a*. In this example, the sealing member 40 may be inserted into the port 15*a* toward the port surface 14, and the nut member 30 may be inserted into the port 15*a* toward the sealing member 40 as the fixing surface 33 is coupled to the inner circumferential surface 15 of the port 15*a*.

In this state, as the nut member 30 can be coupled to the inner circumferential surface 15 of the port 15*a*, the sealing member 40 may be interposed between the nut member 30 and the manifold body 10 to make the gas seal between the nut member 30 and the manifold body 10.

Hereinafter, a principle of sensing outflowing of a fluid provided as colorless, odorless hydrogen gas will be described in detail, as an example fluid.

The pressing surface 34 and the nut-inclined surface 35 of the nut member 30 may move toward the sealing member 40 such that the pressing surface 34 and the nut-inclined surface 35 are closer to the sealing member 40. The pressing surface 34 may make contact with the top surface 43*a* to press the top surface 43*a* of the sealing member 40. Even in this state, the nut-inclined surface 35 may be spaced apart from the top surface 43*a* and the first chamfer surface 44*a* of the sealing member 40 in the first direction (X direction).

According to this structure, the top surface 43*a* of the sealing member 40 may be pressed by the pressing surface 34, and the bottom surface 43*b* of the sealing member 40 may be pressed by the port surface 14.

According to this principle, the sensing dye 50 (see FIG. 8) received in the sealing member body 40*c* (see FIG. 7) may receive force in the first direction (X direction) or the opposite direction (−X direction) to the first direction within the receiving part 41.

In the process of fixing the pipe 20 to the manifold body 10, the sensing dye 50 may flow out to the port 15*a* through the orifice 42. In this state, the internal fluid of the manifold body 10 or the pipe 20 has already leaked in the process of inserting the pipe 20 into the manifold body 10. Alternatively, in the state that the pipe 20 is completely fixed to the manifold body 10, an internal higher-pressure fluid of the manifold body 10 or the pipe 20 may flow out between the manifold body 10 and the inflowing part 23 of the pipe 20 while flowing out.

At such time, the sensing dye 50 may be guided out of the port 15*a* through the guide slot 33*a* formed in the fixed surface 33 together with the higher-pressure fluid due to the attraction of the higher-pressure fluid. As described above, the user can sense the sensing dye 50 using a lighting device that irradiates ultraviolet rays (UV) to determine the flowing of the higher-pressure fluid out of the port 15*a* from an inner part of the manifold body 10 or the pipe fluid passage 21*a*.

When a higher-pressure fluid flows through the outflowing part 47, the higher-pressure fluid of up to 1,050 bars may flow inside the manifold body 10 and inside the pipe 20. Accordingly, the sensing dye 50 may not flow into the manifold body 10 or the pipe 20 due to pressure caused by the higher-pressure fluid.

Additionally, the higher-pressure fluid of up to 1,050 bars may flow inside the manifold body 10) or pipe 20 during the use of the manifold 1 (see FIG. 1) in the state that the pipe 20 is fixed to the manifold body 10. Accordingly, the sensing dye 50 may not flow into the manifold body 10 or the pipe 20 due to pressure caused by the higher-pressure fluid.

According to this structure, the user may check the fluid flowing out of the manifold body 10 or the pipe 20 without being limited to the location, using the sensing dye 50 while fixing the pipe 20 and the nut member 30 to the manifold body 10 or using the manifold 1, thereby improving convenience and preventing safety accidents in advance.

According to an embodiment of the present disclosure, the manifold structure, in which the pipe is inserted into the manifold body, is provided to improve the coupling force, such that the higher-pressure fluid is more stably distributed. Accordingly, the endurance and the gas sealing of the manifold may be improved.

According to an embodiment of the present disclosure, because the fluid flowing out of the port of the manifold body can be sensed, a safety accident may be prevented.

The above description illustrates some example embodiments of the present disclosure, and various modifications and modifications may be made by one skilled in the art without departing from the claimed scopes of the present disclosure.

Therefore, the example embodiments of the present disclosure are provided to explain the spirit and scope of the present disclosure, but not to necessarily limit them, so that the spirit and scope of the present disclosure is not necessarily limited by the example embodiments. The scopes of the present disclosure can be construed on the basis of the accompanying claims, and technical ideas within scopes equivalent to the claims can be included in scopes of the present disclosure.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A manifold comprising:
   a manifold body including a manifold fluid passage and a port configured to discharge a fluid from the manifold fluid passage;
   a pipe inserted into the port of the manifold body and including a pipe fluid passage fluidly connected to the manifold fluid passage via the port;
   a nut member inserted into the port and coupled to the manifold body while supporting the pipe; and
   a sealing member interposed between the nut member and the manifold body outside of the pipe, wherein the sealing member includes a sensing dye therein, and wherein the sealing member is configured to discharge the sensing dye out of the port along with the fluid flowing out of the port from the manifold fluid passage or the pipe fluid passage.

2. The manifold of claim 1, wherein the sealing member includes:
   a sealing member body being outside of the pipe; and
   a receiving part inside the sealing member body configured to receive the sensing dye therein.

3. The manifold of claim 2, wherein the sealing member further includes an orifice in the sealing member body and configured to fluidly communicate the receiving part to the port.

4. The manifold of claim 3, wherein the orifice is on an outer circumferential surface of the sealing member body.

5. The manifold of claim 3, wherein a cross-sectional area of the orifice is increased radially outward.

6. The manifold of claim 5, wherein the sealing member further includes an outflowing surface extending to be inclined in a direction perpendicular to a radial outward direction of the sealing member body, wherein the outflowing surface is adjacent the orifice.

7. The manifold of claim 2, wherein the sealing member further includes:
   a top surface making contact with the nut member; and
   a chamfer surface recessed radially outward of the sealing member body from the top surface.

8. The manifold of claim 1, wherein the sealing member includes rubber.

9. The manifold of claim 1, wherein the nut member includes:
   a fixing surface inserted into the port such that the pipe is fixed to the port and extending in a circumferential direction such that the fixing surface is coupled to an inner circumferential surface of the port; and
   a guide slot in the fixing surface.

10. The manifold of claim 9, wherein the guide slot extends in a direction in which the nut member is inserted into the port.

11. The manifold of claim 1, wherein the nut member includes:
   a pressing surface making contact with the sealing member; and
   a nut-inclined surface inclined in a direction away from the sealing member with respect to an outside of the pressing surface.

12. The manifold of claim 1, wherein the nut member includes:
   an inserting surface facing the sealing member; and
   a pressing protrusion protruding from the inserting surface toward the sealing member and making contact with the sealing member such that the inserting surface is spaced apart from the sealing member.

13. The manifold of claim 1, wherein the sensing dye includes a fluorescent dye configured to be visible using ultraviolet light.

14. A manifold system comprising:
   a manifold body having a first outer surface, a port extending into the manifold body from the first outer surface, the port having a female-threaded portion with a port diameter, and a manifold fluid passage extending from a bottom surface of the port into the manifold body;
   a pipe having a pipe fluid passage configured to be fluidly coupled to the manifold fluid passage via the port;
   a nut member having an inner circumferential surface configured to receive and support an outer circumferential surface of the pipe therein, the nut member having a male-threaded portion on a nut fixing part, the male-threaded portion being configured to threadedly engage with the female-threaded portion of the port, the nut member having a pressing surface configured to face the bottom surface of the port when the nut member is threadedly engaged with the port; and
   a sealing member configured to be outside of the pipe and interposed between the pressing surface of the nut member and the bottom surface of the port when the nut member is threadedly engaged with the port, wherein the sealing member includes a sensing dye therein.

15. The system of claim 14, wherein the sealing member includes a receiving part therein containing the sensing dye, wherein the sealing member includes an orifice extending from the receiving part to a radially outer surface of the sealing member, and wherein the sealing member is configured such that the receiving part is fluidly coupled to the port via the orifice when the nut member is threadedly engaged with the port and when the sealing member is interposed between the pressing surface of the nut member and the bottom surface of the port.

16. The system of claim 15, wherein the radially outer surface of the sealing member has a generally v-shaped sectional shape.

17. A manifold system comprising:

a manifold body having a first outer surface, a port extending into the manifold body from the first outer surface, the port having a female-threaded portion with a port diameter, and a manifold fluid passage extending from a bottom surface of the port into the manifold body;

a pipe having a pipe fluid passage configured to be fluidly coupled to the manifold fluid passage via the port;

a nut member having an inner circumferential surface configured to receive and support an outer circumferential surface of the pipe therein, the nut member having a male-threaded portion on a nut fixing part, the male-threaded portion being configured to threadedly engage with the female-threaded portion of the port, the nut member having a pressing surface configured to face the bottom surface of the port when the nut member is threadedly engaged with the port, wherein the nut fixing part includes a guide slot therein, the guide slot extending along the nut fixing part to intersect the male-threaded portion, such that the guide slot is configured to provide fluid communication between a bottom space of the port adjacent to the bottom surface and the first outer surface of the manifold body when the nut member is threadedly engaged with the port; and a sealing member configured to be outside of the pipe and interposed between the pressing surface of the nut member and the bottom surface of the port when the nut member is threadedly engaged with the port, wherein the sealing member includes a sensing dye therein.

18. The system of claim 17, wherein the sealing member includes a receiving part therein containing the sensing dye, wherein the sealing member includes an orifice extending from the receiving part to a radially outer surface of the sealing member, and wherein the sealing member is configured such that the receiving part is fluidly coupled to the bottom space of the port via the orifice when the nut member is threadedly engaged with the port and when the sealing member is interposed between the pressing surface of the nut member and the bottom surface of the port.

19. The system of claim 18, wherein the radially outer surface of the sealing member has a generally v-shaped sectional shape.

20. The system of claim 18, wherein the guide slot extends in a direction in which the nut member is inserted into the port, wherein a cross-sectional area of the orifice is increased radially outward, wherein the sealing member includes rubber, and wherein the sensing dye includes a fluorescent dye configured to be visible using ultraviolet light.

* * * * *